(12) United States Patent
Herth et al.

(10) Patent No.: US 8,436,072 B2
(45) Date of Patent: May 7, 2013

(54) MIXTURES COMPRISING BRANCHED OLIGOMERIC OR POLYMERIC COMPOUNDS, AND PREPARATION AND USE THEREOF

(75) Inventors: Gregor Herth, Trostberg (DE); Monika Haberecht, Ludwigshafen (DE); Yulia Fogel, Traunstein (DE); Francisco Javier Lopez Villanueva, Mannheim (DE); Bernd Bruchmann, Freinsheim (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 12/834,373

(22) Filed: Jul. 12, 2010

(65) Prior Publication Data

US 2011/0015301 A1    Jan. 20, 2011

(30) Foreign Application Priority Data

Jul. 15, 2009   (EP) .................................... 09165572

(51) Int. Cl.
| | |
|---|---|
| C09K 8/00 | (2006.01) |
| C08F 22/02 | (2006.01) |
| C08F 122/02 | (2006.01) |
| C08F 222/02 | (2006.01) |

(52) U.S. Cl.
USPC ........................................ 523/130; 526/318.2

(58) Field of Classification Search .................... 523/130
See application file for complete search history.

(56) References Cited

U.S. PATENT DOCUMENTS

| | | | |
|---|---|---|---|
| 5,837,789 A | 11/1998 | Stockhausen et al. | |
| 6,333,109 B1 * | 12/2001 | Harada et al. ................. | 428/402 |

(Continued)

FOREIGN PATENT DOCUMENTS

| | | |
|---|---|---|
| CH | 629 232 A5 | 4/1982 |
| DE | 195 39 250 A1 | 5/1996 |

(Continued)

OTHER PUBLICATIONS

U.S. Appl. No. 13/028,624, filed Feb. 16, 2011, Roller, et al.

(Continued)

*Primary Examiner* — Peter F Godenschwager
*Assistant Examiner* — David Karst
(74) *Attorney, Agent, or Firm* — Oblon, Spivak, McClelland, Maier & Neustadt, L.L.P.

(57) ABSTRACT

Mixtures comprising
(A) at least one hydraulic or latently hydraulic binder,
(B) at least one copolymer obtainable by reacting
(α1) at least one ethylenically unsaturated comonomer having at least one functional group selected from COOH groups, sulfonic acid groups, nitrile groups, hydroxyalkyl groups and amino groups, or
(α2) at least one (co)polymer of at least one ethylenically unsaturated comonomer having at least one functional group selected from COOH groups, sulfonic acid groups, nitrile groups, hydroxyalkyl groups and amino groups, with
(β) at least one oligomeric or polymeric compound obtainable by reacting
(a) at least one ethylenically unsaturated di- or polycarboxylic acid or anhydride or ester thereof with
(b) at least one at least trifunctional alcohol and
(c) at least one compound of the general formula I

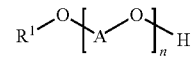

in which the variables are each defined as follows:
$R^1$ is selected from $C_1$-$C_4$-alkyl and hydrogen,
A is the same or different and is selected from $C_2$-$C_6$-alkylene,
n is in the range from 4 to 40, and
(d) optionally at least one further compound having at least one COOH group or at least one alcoholic OH group per molecule.

13 Claims, 1 Drawing Sheet

Time-dependent slump behavior of an inventive construction material mixture which comprises inventive copolymer (B.1)

U.S. PATENT DOCUMENTS

| | | |
|---|---|---|
| 6,603,056 B2 | 8/2003 | Beihoffer et al. |
| 2006/0054056 A1 | 3/2006 | Jungk |
| 2007/0088100 A1* | 4/2007 | Ahmed et al. ............... 523/130 |
| 2008/0140037 A1* | 6/2008 | Newman ...................... 604/367 |
| 2010/0119775 A1 | 5/2010 | Bustos et al. |

FOREIGN PATENT DOCUMENTS

| | | |
|---|---|---|
| EP | 0 144 703 | 6/1985 |
| EP | 0 310 972 A2 | 4/1989 |
| EP | 0 425 947 A2 | 5/1991 |
| JP | 10-101392 | 4/1998 |
| WO | WO 00/18820 | 4/2000 |
| WO | WO 2004/020503 A1 | 3/2004 |

OTHER PUBLICATIONS

U.S. Appl. No. 12/834,310, filed Jul. 12, 2010, Al-Hellani, et al.

Search Report issued Dec. 9, 2010 in International Application No. PCT/EP2010/059847.

Alexander Sunder, et al., "Controlling the Growth of Polymer Trees: Concepts and Perspectives for Hyperbranched Polymers", Chem. Eur. J., vol. 6, No. 14, 2000, pp. 2499-2506.

D. Hölter, et al., "Degree of branching in hyperbranched polymers", Acta Polymer., vol. 48, 1997, pp. 30-35.

U.S. Appl. No. 13/006,819, filed Jan. 14, 2011, Schoenfelder, et al.

* cited by examiner

FIG. 1

Time-dependent slump behavior of an inventive construction material mixture which comprises inventive copolymer (B.1)

FIG. 2

Time-dependent slump behavior of an inventive construction material mixture which comprises inventive copolymer (B.2)

MIXTURES COMPRISING BRANCHED OLIGOMERIC OR POLYMERIC COMPOUNDS, AND PREPARATION AND USE THEREOF

The present invention relates to mixtures comprising
(A) at least one hydraulic or latently hydraulic binder,
(B) at least one copolymer obtainable by reacting
  (α1) at least one ethylenically unsaturated comonomer having at least one functional group selected from COOH groups, sulfonic acid groups, nitrile groups, hydroxyalkyl groups and amino groups, or
  (α2) at least one (co)polymer of at least one ethylenically unsaturated comonomer having at least one functional group selected from COOH groups, sulfonic acid groups, nitrile groups, hydroxyalkyl groups and amino groups, with
(β) at least one oligomeric or polymeric compound obtainable by reacting
  (a) at least one ethylenically unsaturated di- or polycarboxylic acid or anhydride or ester thereof with
  (b) at least one at least trifunctional alcohol and
  (c) at least one compound of the general formula I in which the variables are each defined as follows:
$R^1$ is selected from $C_1$-$C_4$-alkyl and hydrogen,
A is the same or different and is selected from $C_2$-$C_6$-alkylene,
n is in the range from 4 to 40, and
(d) optionally at least one further compound having at least one COOH group or at least one alcoholic OH group per molecule.

The present invention further relates to processes for preparing inventive mixtures and to the use thereof.

The present invention further relates to oligomeric or polymeric compounds (β') obtainable by reacting
(a) at least one ethylenically unsaturated di- or polycarboxylic acid or anhydride or ester thereof with
(b) at least one at least trifunctional alcohol and
(c) at least one compound of the general formula I in which the variables are each defined as follows:
$R^1$ is selected from $C_1$-$C_4$-alkyl and hydrogen,
A is the same or different and is selected from $C_2$-$C_6$-alkylene,
n is in the range from 4 to 40,
(d) optionally at least one further compound having at least one COOH group or at least one alcoholic OH group per molecule, where at least trifunctional alcohol (b) is selected from $C_3$-$C_8$-triols which may be alkoxylated with alkylene oxide (e), which alkylene oxide (e) is selected from $C_3$-$C_6$-alkylene oxide, and to a process for preparing inventive polymeric or oligomeric compounds (β'). The present invention further relates to copolymers (B).

Numerous mixtures can be used as construction materials. For this purpose, water and hydraulic or latently hydraulic binders are admixed with one or more assistants which improve, for example, the flowability or the time-dependent water-absorbing properties. The assistants used may be organic polymers, for example polyacrylates. It has also already been proposed to use superabsorbent polymers (superabsorbents), which are known from other applications, for example diapers.

Superabsorbents are generally understood to mean crosslinked, high molecular weight, anionic or cationic polyelectrolytes which are obtainable by free-radical polymerization of suitable ethylenically unsaturated vinyl compounds and subsequent measures for drying the resulting copolymers. On contact with water or aqueous systems, a hydrogel forms with swelling and water absorption, which can absorb several times the weight of the pulverulent copolymer. Hydrogels are understood to mean water-comprising gels based on hydrophilic but water-insoluble polymers which are crosslinked and are thus present as three-dimensional networks.

Superabsorbents which are employed in hygiene products, for example diapers, should very rapidly absorb moisture; otherwise, they would leak and the desired effect would not occur.

For applications in the construction chemicals sector and especially in dry mortars and concrete, this means that, however, the full absorption capacity of the superabsorbent polymer would be attained as early as during the mixing phase (mixing of the dry mortar into water), which is in many cases undesired; the mixing water is thus no longer available for the adjustment of the consistency (rheology). There are some applications of dry mortars (for example as jointing mortars) or concretes (manufacture of precast concrete components) in which, after they have been introduced into the joint or into the mold of the precast component, a steep rise in the viscosity is desired (referred to hereinafter as rheology jump). The jointing mortar should be easy to introduce into the joint, whereas it should ultimately be stiff and dimensionally stable in the joint. A concrete for the precast components industry should be easy to introduce into the mold, but then very rapidly have a solid consistency, in order that it is possible to demold speedily.

Generally, the viscosity of a construction material made up with water depends on the water content of the cement matrix. The water content is described by the water/cement value. The higher this value is, the lower the viscosity of the construction material. With regard to the hydrogels already mentioned, the hydrogel formed from the superabsorbent copolymer by water absorption should have a minimum level of water-soluble components, in order not to adversely affect the rheology properties of the construction material mixtures.

A further problem in construction material mixtures is bleeding, which sets in with time; i.e. water separates from the mixed construction material mixture, accumulates on the surface and floats on top. This bleeding is generally undesired, since it likewise removes the mixing water required for the hydration from the construction material mixture. In many applications, the evaporated water leaves behind an unappealing salt crust, which is generally undesired.

For applications of dry mortars, for example jointing mortars and leveling materials for floors, an accelerated setting process is likewise desirable. During the processing in the joint or on the floor, a low viscosity is desired, which should then rise rapidly in the joint, in order that the shape is maintained. The sooner this is the case, the sooner the tiles laid can be washed without washing out the joint again. This would constitute a considerable benefit for the user, since mortar residues would be more easily removable from the joints without leaving behind cement streaks or attacking the surface of the tile.

To date, this processing profile has been established by means of a mixture of portland cement (PC) and alumina cement (AC). Although it is possible in this way to establish the desired rheology profile, other difficulties occur. Generally, a PC/AC formulation is more difficult to establish and less reliable than a pure PC formulation, i.e. raw material variations or slight deviations in the composition have major effects. In most PC/AC formulations, $Li_2CO_3$ additionally has to be added, which is a significant cost driver for these products. A further major problem on application is the low storage stability. Specifically, in the course of storage, a shift in the rheology profile occurs, which is undesired.

In many cases, formulators of dry mortars would prefer pure PC systems, such that superabsorbent polymers with a very retarded swelling action might constitute an important component of future formulations.

For leveling materials, the early strength discussed above is economically very important. The higher the early strength, the more rapidly the further layers can be applied to a floor. However, a minimum level of mixing water is needed to achieve the necessary flowability of a leveling material. This is difficult to combine with the desired early strength, since this depends, as described above, on the w/c value. Therefore, a concentration of the pore solution after application would also be desired here. A problem which frequently occurs in practice here too is the above-described bleeding. This often occurs in the first few hours after processing. The water on the surface evaporates and leaves behind an unappealing surface appearance (crust formation).

In the precast concrete components industry, there is currently high cost pressure. A significant component of the cost structure is the residence time in the mold. The more quickly the precast component can be taken from the mold, the less expensive the production is. It is obvious that this can only be done once the molding has a certain stability. To fill the mold, a minimum viscosity is required, whereas a relatively high viscosity of the concrete is desired subsequently in the mold. What would thus be ideal would be a rheology jump of the unset construction material mixture in the mold. The consistency of a concrete for the precast components industry again depends on the water-cement value (w/c value); the higher the w/c value, the lower the viscosity. In addition, the consistency is adjusted by the use of plasticizers.

Reference is made at this point to the following documents:

U.S. Pat. No. 5,837,789 describes a crosslinked polymer which is used for absorption of aqueous liquids. This polymer is formed from partly neutralized monomers with monoethylenically unsaturated acid groups and optionally further monomers copolymerized with the first component groups. Also described is a process for preparing these polymers, wherein the particular starting compounds are first polymerized to a hydrogel with the aid of solution or suspension polymerization. The polymer thus obtained can subsequently be crosslinked on its surface, which should preferably be done at elevated temperatures.

Gel particles with superabsorbent properties, which are composed of a plurality of components, are described in U.S. Pat. No. 6,603,056 B2. The gel particles comprise at least one resin which is capable of absorbing acidic aqueous solutions and at least one resin which can absorb basic aqueous solutions. Each particle also comprises at least one microdomain of the acidic resin, which is in direct contact with a microdomain of the basic resin. The superabsorbent polymer thus obtained is notable for a defined conductivity in salt solutions, and also for defined absorption capacity under pressure conditions.

US 2006/0054056 describes a process for manufacturing concrete products with a reduced tendency to efflorescence. In this context, water-absorbing polymers find a specific use. These absorbent components are added to the concrete mixture in powder form, as a liquid or as a granule. In connection with the water-absorbing components, especially organic thickeners, for example cellulose and derivatives thereof, but also polyvinyl alcohol and polyacrylamides, and also polyethylene oxides, are mentioned. However, useful thickeners are also starch-modified superabsorbent polyacrylates and insoluble, water-swellable and crosslinked cellulose ethers, and additionally sulfonated monovinylidene polymers, Mannich acrylamide polymers and polydimethyldiallylammonium salts.

WO 2004/020503 discloses water-soluble hyperbranched polyesters. Many water-soluble polyesters are, however, generally sweated out again from built structures, for example brickwork, after a certain time, for example after a year, and are therefore generally unsuitable as assistants for construction materials.

It was therefore an object of the present invention to provide mixtures which have particularly good flowability or allow good flowabilities and also good time-dependent water-absorbing performance to be achieved in construction materials. It was a further object of the present invention to provide copolymers which are particularly suitable as an additive in construction materials, and it was an object of the present invention to provide a process for preparing such copolymers.

Accordingly, the mixtures defined at the outset have been found, also referred to as inventive mixtures for short. Inventive mixtures comprise (A) at least one hydraulic or latently hydraulic binder, (B) at least one copolymer obtainable by reacting (α1) at least one ethylenically unsaturated comonomer having at least one functional group selected from COOH groups, sulfonic acid groups, nitrile groups, hydroxyalkyl groups and amino groups, comonomer (α1) for short, or (α2) at least one (co)polymer of at least one ethylenically unsaturated comonomer having at least one functional group selected from COOH groups, sulfonic acid groups, nitrile groups, hydroxyalkyl groups and amino groups, comonomer (α2) for short, with (β) at least one oligomeric or polymeric compound, also referred to as oligomer (β) or polymer (β) for short, which is characterized further down.

Hydraulic binders are understood to mean preferably inorganic substances which can cure under air and under water. Latently hydraulic binders are understood to mean preferably inorganic substances which can cure in the presence of at least one further construction material such as lime, and under air and under water. Hydraulic and latently hydraulic binders are also referred to in the context of the present invention as binders (A) for short.

DESCRIPTION OF THE DRAWINGS

Figure 1:
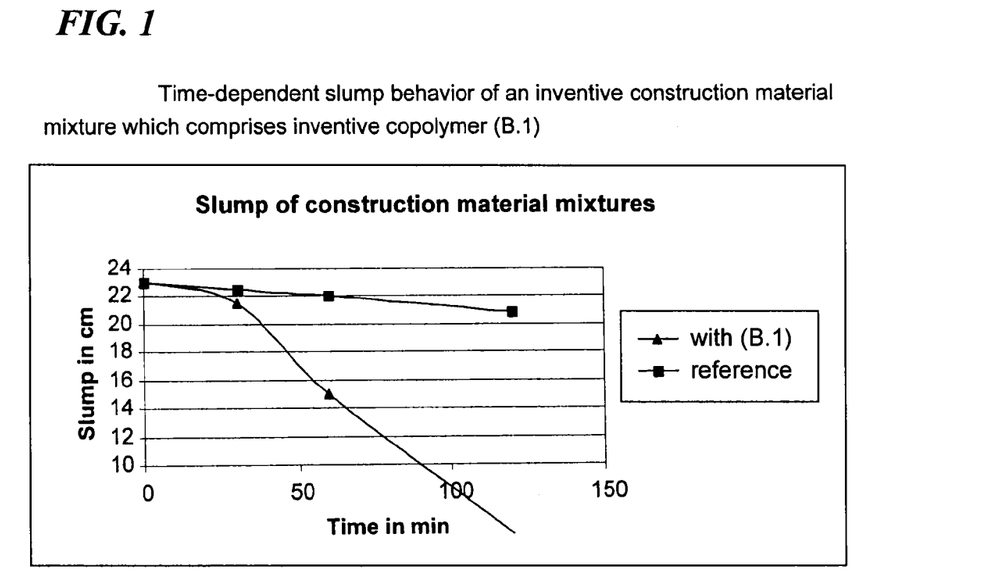
FIG. 1 shows the time-dependent slump behavior of an inventive construction material mixture which comprises inventive copolymer (B.1) in comparison with a reference material without inventive copolymer (B.1).

FIG. 1 shows the time-dependent slump behavior of an inventive construction material mixture which comprises inventive copolymer (B.1) in comparison with a reference material without inventive copolymer (B.1). It can be seen from the diagram that addition of inventive copolymer (B.1) to a construction material mixture considerably improves the slump behavior. After one hour and more, the construction material mixture without inventive copolymer (B.1) is still basically stable. The construction material mixture with inventive copolymer (B.1) has spread due to a rheology jump and is of improved use for construction purposes.

Figure 2:
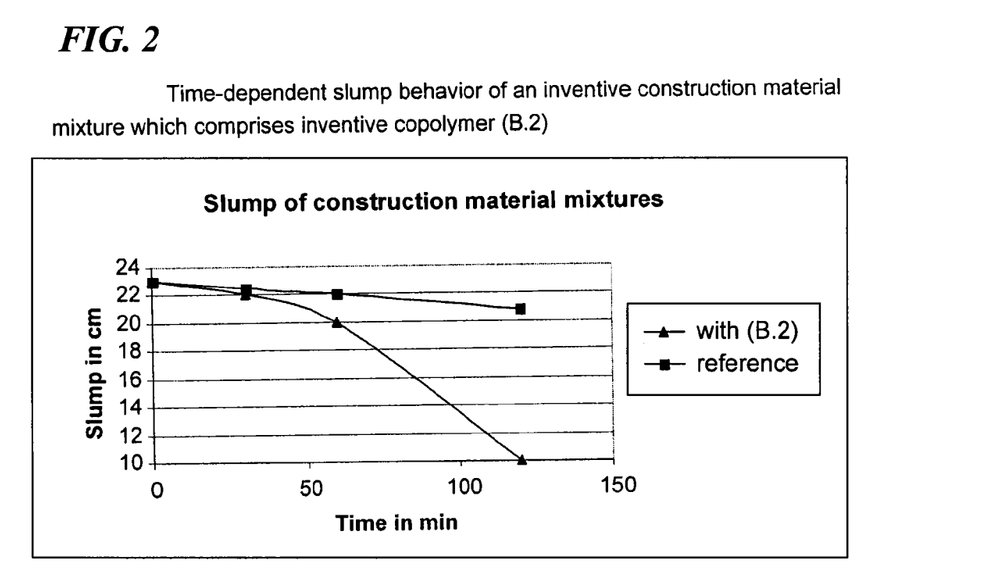
FIG. 2 shows the time-dependent slump behavior of an inventive reference material mixture which comprises inventive copolymer (B.2) in comparison with a comparative material without inventive copolymer (B.2).

FIG. 2 shows the time-dependent slump behavior of an inventive construction material mixture which comprises inventive copolymer (B.2) in comparison with the reference material without inventive copolymer (B.2). It can be seen from the diagram that addition of inventive copolymer (B.2) to a construction material mixture considerably improves the slump behavior. After one hour and more, the construction material mixture without inventive copolymer (B.2) is still basically stable. The construction material mixture with inventive copolymer (B.2) has spread due to a rheology jump and is of improved use for construction purposes.

In one embodiment of the present invention, binder (A) is selected from cement, lime, gypsum, hemihydrate, anhydrite, fly ash, volcanic ashes, for example pozzolan, and also tuff and furnace slag.

Inventive mixtures further comprise at least one copolymer (B). Copolymer (B) is preferably a superabsorbent, also known as superabsorbent polymer (B) or superabsorbent (B).

Copolymer (B) is obtainable by reacting (α1) at least one ethylenically unsaturated comonomer having at least one functional group selected from COOH groups, sulfonic acid groups, nitrile groups, hydroxyalkyl groups and amino groups, especially $NH_2$ groups (variant 1), or (α2) at least one (co)polymer of at least one ethylenically unsaturated comonomer having at least one functional group selected from COOH groups, sulfonic acid groups, nitrile groups, hydroxyalkyl groups and amino groups, especially $NH_2$ groups (variant 2), with (β) at least one oligomeric or polymeric compound (β).

The two aforementioned variants 1 and 2 differ principally in the type or position of the incorporation of the oligomeric or polymeric compound (β) in copolymer (B).

In the context of the present invention, superabsorbent polymers (B) are based preferably on ethylenically unsaturated compounds, preferably selected from ethylenically unsaturated carboxylic acids and ethylenically unsaturated sulfonic acid monomers, and salts and derivatives, especially methyl esters of ethylenically unsaturated carboxylic acids and ethylenically unsaturated sulfonic acid monomers, preferably acrylic acid, methacrylic acid, ethacrylic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, itaconic acid, citraconic acid, mesaconic acid, glutaconic acid, aconitic acid, maleic acid, fumaric acid, tricarboxyethylene, itaconic anhydride, maleic anhydride or mixtures thereof. Very particular preference is given to (meth)acrylic acid and maleic acid.

Examples of suitable monomers having sulfonic acid groups are sulfoethyl acrylate, sulfoethyl methacrylate, sulfopropyl acrylate, sulfopropyl methacrylate, 2-hydroxy-3-methacryloyloxypropylsulfonic acid and 2-acrylamido-2-methylpropanesulfonic acid (AMPS).

Examples of suitable monomers having hydroxyalkyl groups are aliphatic diols monoesterified with ethylenically unsaturated monocarboxylic acids. Examples of aliphatic diols are ethylene glycol, 1,2-propanediol, 1,3-propanediol, 1,2-butanediol, 1,3-butanediol, 1,4-butanediol, 1,6-hexanediol, 1,2-hexanediol and 1,10-decanediol. Suitable ethylenically unsaturated monocarboxylic acids are crotonic acid and especially (meth)acrylic acid. Examples of particularly suitable monomers with hydroxyalkyl groups are 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 4-hydroxybutyl acrylate and 4-hydroxybutyl methacrylate.

Examples of suitable monomers with nitrile groups are acrylonitrile and methacrylonitrile.

Examples of suitable monomers having amino groups are those having primary, secondary and preferably tertiary amino groups, especially those having one tertiary amino group per molecule, and those having a carboxamide group. Preferred examples are (meth)acrylic esters of amino-containing alcohols. Particular preference is given to tert-butylaminoethyl (meth)acrylate, tert-butylaminopropyl (meth) acrylate and especially N,N-dimethylaminopropyl (meth) acrylate, N,N-dimethylaminoethyl methacrylate and N,N-diethylaminoethyl acrylate.

Particularly suitable monomers having amino groups are selected from acrylamide and acrylamide derivatives, preferably alkyl-substituted acrylamides or aminoalkyl-substituted derivatives of acrylamide or of methacrylamide, and more preferably from acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide, N-tert-butylacrylamide, N-vinylformamide, N-vinylacetamide, or mixtures thereof.

Copolymer (B) preferably comprises acrylamide in polymerized form.

In one embodiment of the present invention, superabsorbent (B) comprises at least one, preferably at least two, crosslinkers in polymerized form. Crosslinkers are understood hereinafter to mean those comonomers which can join at least two polymer chains to one another, for example because they have two polymerizable ethylenic double bonds per molecule. The actual superabsorbent then forms a water-swellable but water-insoluble network.

In one embodiment of the present invention, crosslinkers are selected from the group of the hydrolysis-stable crosslinkers and from the group of the hydrolysis-labile crosslinkers. A hydrolysis-stable crosslinker shall be understood to mean a crosslinker which—incorporated in the network—maintains its crosslinking action in a pH-independent manner. The linkage points of the network thus cannot be broken up by a pH change of the swelling medium. These contrast with hydrolysis-labile crosslinkers which—incorporated in the network—can lose their crosslinking action through a change in the pH. Examples are di(meth)acrylate crosslinkers, which lose their crosslinking action as a result of alkaline ester hydrolysis.

Possible hydrolysis-stable crosslinkers are N,N'-methylenebis(meth)acrylamide and monomers having more than one maleimide group per molecule, such as hexamethylenebismaleimide; monomers having more than one vinyl ether group per molecule, such as ethylene glycol divinyl ether, triethylene glycol divinyl ether and/or cyclohexanediol divinyl ether, for example cyclohexane-1,4-diol divinyl ether.

It is also possible to use allylamino or allylammonium compounds with more than one allyl group, such as triallylamine and/or tetraallylammonium salts. The hydrolysis-stable crosslinkers also include the allyl ethers, such as tetraallyloxyethane and pentaerythrityl triallyl ether.

From the group of the monomers having more than one vinyl aromatic group, mention should be made of divinylbenzene and triallyl isocyanurate.

It is preferred when the hydrolysis-stable crosslinker used is at least one representative from the group of N,N'-methylenebisacrylamide, N,N'-methylenebismethacrylamide or monomers having at least one maleimide group per molecule, preferably hexamethylenebismaleimide, monomers having more than one vinyl ether group per molecule, preferably ethylene glycol divinyl ether, triethylene glycol divinyl ether, cyclohexanediol divinyl ether, allylamino or allylammonium compounds having more than one allyl group, preferably triallylamine or a tetraallylammonium salt such as tetraallylammonium chloride, or allyl ethers having more than one allyl group, such as tetraallyloxyethane and pentaerythrityl triallyl ether, or monomers having vinyl aromatic groups, preferably divinylbenzene and triallyl isocyanurate, or diamines, triamines, tetramines or higher-functionality amines, preferably ethylenediamine and diethylenetriamine.

Hydrolysis-labile crosslinkers may be: poly-(meth)acryloyl-functional monomers such as 1,4-butanediol diacrylate, 1,4-butanediol dimethacrylate, 1,3-butyleneglycol diacrylate, 1,3-butylene glycol dimethacrylate, diethylene glycol diacrylate, diethylene glycol dimethacrylate, ethylene glycol diacrylate, ethylene glycol dimethacrylate, ethoxylated bisphenol A diacrylate, ethoxylated bisphenol A dimethacrylate, 1,6-hexanediol diacrylate, 1,6-hexanediol dimethacrylate, neopentyl glycol dimethacrylate, polyethylene glycol diacrylate, polyethylene glycol dimethacrylate, triethylene glycol diacrylate, triethylene glycol dimethacrylate, tripropylene glycol di(meth)acrylate, tetraethylene glycol diacrylate, tetraethylene glycol dimethacrylate, dipentaerythrityl pentaacrylate, pentaerythrityl tetraacrylate, pentaerythrityl triacrylate, trimethylolpropane triacrylate, trimethylolpropane trimethacrylate, cyclopentadiene diacrylate, tris(2-hydroxyethyl) isocyanurate triacrylate and/or tris(2-hydroxyethyl) isocyanurate trimethacrylate; monomers having more than one vinyl ester or allyl ester group with an appropriate carboxylic acid per molecule, such as divinyl esters of polycarboxylic acids, diallyl esters of polycarboxylic acids, for example diallyl terephthalate, diallyl maleate, diallyl fumarate, trivinyl trimellitate, divinyl adipate and/or diallyl succinate.

Compounds polymerized as preferred representatives of the hydrolysis-labile crosslinkers are selected from the group of the di-, tri- and tetra(meth)acrylates, such as 1,4-butanediol di(meth)acrylate, 1,3-butylene glycol di(meth)acrylate, 1,2-butylene glycol di(meth)acrylate, diethylene glycol di(meth)acrylate, ethylene glycol diacrylate, ethylene glycol dimethacrylate, ethoxylated bisphenol A diacrylate, ethoxylated bisphenol A dimethacrylate, 1,6-hexanediol diacrylate, 1,6-hexanediol dimethacrylate, neopentyl glycol di(meth)acrylate, polyethylene glycol diacrylate, polyethylene glycol dimethacrylate, triethylene glycol diacrylate, triethylene glycol dimethacrylate, tripropylene glycol diacrylate, tetraethylene glycol diacrylate, tetraethylene glycol dimethacrylate, dipentaerythrityl pentaacrylate, pentaerythrityl tetraacrylate, pentaerythrityl triacrylate, trimethylolpropane triacrylate, trimethylolpropane trimethacrylate, cyclopentadiene diacrylate, tris(2-hydroxyethyl) isocyanurate triacrylate and/or tris(2-hydroxyethyl) isocyanurate trimethacrylate, the monomers having more than one vinyl ester or allyl ester group with appropriate carboxylic acids, such as divinyl esters of polycarboxylic acids, diallyl esters of di- or polycarboxylic acids, for example diallyl terephthalate, diallyl maleate, diallyl fumarate, trivinyl trimellitate, divinyl adipate and/or diallyl succinate or at least one representative of the compounds having at least one vinylic or allylic double bond and at least one epoxy group, such as glycidyl acrylate, allyl glycidyl ether, or the compounds having more than one epoxy group, such as ethylene glycol diglycidyl ether, diethylene glycol diglycidyl ether, polyethylene glycol diglycidyl ether, polypropylene glycol diglycidyl ether, or the compounds having at least one vinylic or allylic double bond and at least one (meth)acrylate group, such as polyethylene glycol monoallyl ether acrylate or polyethylene glycol monoallyl ether methacrylate.

Further crosslinkers which comprise functional groups both from the class of the hydrolysis-labile crosslinkers and the hydrolysis-stable crosslinkers should be counted among the hydrolysis-labile crosslinkers when they form not more than one hydrolysis-stable crosslinking point. Typical examples of such crosslinkers are polyethylene glycol monoallyl ether acrylate and polyethylene glycol monoallyl ether methacrylate.

In addition to crosslinkers having two or more ethylenic double bonds per molecule, suitable crosslinkers also include those which comprise only one double bond, if any, but do comprise other functional groups which can react with other comonomers of superabsorbent (B) and lead to crosslinking points during the preparation process of superabsorbent (B). Particularly suitable functional groups are in particular epoxy groups and nucleophilic amino groups, i.e. primary amino groups or secondary amino groups without sterically complex substitution. Examples of such crosslinkers with an ethylenic double bond are glycidyl acrylate, allyl glycidyl ether. Examples of crosslinkers without a double bond are nucleophilic diamines such as ethylenediamine, triamines such as diethylenetriamine, compounds having four or more nucleophilic amino groups per molecule, or diepoxides such as ethylene glycol diglycidyl ether, diethylene glycol diglycidyl ether, polyethylene glycol diglycidyl ether and polypropylene glycol diglycidyl ether.

In the production of superabsorbent (B), typically such high total amounts of crosslinker are used as to form a very close-mesh network. Superabsorbent (B) thus has an only low absorption capacity after short times (between 5 and 10 minutes—based on the final swelling after hydrolysis of all crosslinking points).

In one embodiment of the present invention, hydrolysis-stable crosslinkers are polymerized in the range from 0.01 to 1.0 mol %, preferably from 0.03 to 0.7 mol % and more preferably from 0.05 to 0.5 mol %, based in each case on superabsorbent (B).

In one embodiment of the present invention, hydrolysis-labile crosslinkers are polymerized in the range from 0.1 to 10.0 mol %, preferably 0.3 to 7 mol % and more preferably 0.5 to 5.0 mol %, based on the overall superabsorbent (B).

It is preferred that more hydrolysis-labile crosslinkers are polymerized than hydrolysis-stable crosslinkers.

Polymerized oligomer ($\beta$) or polymer ($\beta$) acts as a hydrolysis-labile crosslinker.

In one embodiment of the present invention, the acid groups in copolymer (B) are neutralized at least partially, preferably completely, for example with alkali metal ions, especially with $Na^+$, or with $Mg^{2+}$, $Ca^{2+}$, ammonium or with one or more amines. The neutralizing can be effected with basic salts, for example with the aid of sodium hydroxide, potassium hydroxide, calcium hydroxide or magnesium hydroxide, of sodium carbonate, potassium carbonate, calcium carbonate or magnesium carbonate, and additionally with ammonia, with primary, secondary or tertiary $C_1$-$C_{20}$-alkylamine, with $C_1$-$C_{20}$-alkanolamine, with $C_5$-$C_8$-cycloalkylamine and/or with $C_6$-$C_{14}$-arylamine, where the aforementioned amines may have one or more branched or unbranched alkyl groups having 1 to 8 carbon atoms.

Superabsorbents (B) may further comprise, in polymerized form, one or more further comonomers, especially one or more nonionic comonomers. Further suitable comonomers are vinyllactams such as N-vinylpyrrolidone or N-vinylcaprolactam, and vinyl ethers such as methyl polyethylene glycol-(350 to 3000) monovinyl ether, or those which derive from hydroxybutyl vinyl ether, such as polyethylene glycol-(500 to 5000) vinyloxybutyl ether, polyethylene glycol-block-propylene glycol-(500 to 5000) vinyloxybutyl ether, mixtures also being useful.

In one embodiment of the present invention, superabsorbent (B) is a water-insoluble copolymer, i.e. the water solubility at 25° C. in distilled water (pH in the range from 6 to 7) is less than 1 g/l.

In one embodiment of the present invention, superabsorbent (B) comprises at least two of the aforementioned comonomers in polymerized form, for example (meth)acrylic acid and at least one hydrolysis-stable crosslinker.

In one embodiment of the present invention, superabsorbent (B) comprises at least one ethylenically unsaturated carboxylic acid and at least one (meth)acrylic ester of amino-containing alcohols incorporated therein, preferably up to 5% by weight of ethylenically unsaturated carboxylic acid and up to 30% by weight of (meth)acrylic esters of amino-containing alcohols.

Superabsorbent (B) comprises at least one oligomeric or polymeric compound (β) in polymerized form, in the context of the present invention also referred to for short as oligomer (β) or polymer (β). Oligomer (β) or polymer (β) is obtainable by reacting (a) at least one ethylenically unsaturated di- or polycarboxylic acid or anhydride or ester thereof, in the context of the present invention also known for short as dicarboxylic acid (a) or polycarboxylic acid (a) or anhydride or ester of dicarboxylic acid (a) or polycarboxylic acid (a), with (b) at least one at least trifunctional alcohol, in the context of the present invention also known for short as alcohol (b), and (c) at least one compound of the general formula I in which the variables are each defined as follows:

$R^1$ is selected from hydrogen and $C_1$-$C_4$-alkyl, for example methyl, ethyl, n-propyl, isopropyl, n-butyl, isobutyl, sec-butyl and tert-butyl, preference being given to ethyl and particular preference to methyl.

A are different or preferably the same and are selected from $C_2$-$C_6$-alkylene, for example —$CH_2$—$CH_2$—, —$CH_2$—$CH_2$—$CH_2$—, —$CH_2$—$CH(CH_3)$—, —$CH(CH_3)$—$CH_2$—, —$CH_2$—$CH(C_2H_5)$—, —$CH(C_2H_5)$—$CH_2$—, —$(CH_2)_4$—, —$(CH_2)_5$—, —$(CH_2)_6$—, especially —$CH_2$—$CH_2$—.

n is in the range from 4 to 40, preferably 10 to 20. The variable n may be a mean value, preferably the numerical mean.

In one embodiment of the present invention, dicarboxylic acid (a) is selected from ethylenically unsaturated $C_4$-$C_{10}$-di- or -polycarboxylic acids, preferably from monoethylenically unsaturated $C_4$-$C_{10}$-dicarboxylic acids, i.e. $C_4$-$C_{10}$-dicarboxylic acids with one C—C double bond per molecule, or anhydrides thereof. Examples are maleic acid, fumaric acid, itaconic acid, citraconic acid, methylenemalonic acid, mesaconic acid, maleic anhydride, especially maleic acid and maleic anhydride.

Dicarboxylic acid (a) or polycarboxylic acid (a) may be replaced entirely or in a certain percentage by the corresponding esters, especially mono-, di- or poly-$C_1$-$C_4$-alkyl esters, especially by the mono- or dimethyl esters or the mono- or diethyl esters.

In one embodiment of the present invention, alcohol (b) is selected from tri-, tetra- or polyols having 3 to 10 carbon atoms per molecule, for example glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, N,N,N-triethanolamine, triisopropylamine, trimethylolbutane, trimethylolpropane, trimethylolethane, pentaerythritol or dipentaerythritol, bistrimethylolpropane, bistrimethylolethane, sugar alcohols, for example mesoerythritol, threitol, sorbitol, mannitol or mixtures of the above alcohols (B). Preference is given to glycerol, trimethylolpropane, trimethylolethane or pentaerythritol, very particular preference to trimethylolpropane.

In one embodiment of the present invention, alcohol (b) is selected from $C_3$-$C_8$-triols.

In one embodiment of the present invention, alcohol (b) is selected from $C_3$-$C_8$-triols which are mono- or polyalkoxylated with at least one alkylene oxide (e). Alkylene oxide (e) is selected from $C_3$-$C_6$-alkylene oxide, for example propylene oxide, butylene oxide, tetrahydrofuran, individually or as a mixture, preferably mixtures of propylene oxide and butylene oxide, more preferably of propylene oxide or butylene oxide and especially propylene oxide.

In one embodiment of the present invention, alcohol (b) is selected from $C_3$-$C_8$-triols which are mono- or polyalkoxylated with at least one alkylene oxide (e). Alkylene oxide (e) is selected from $C_3$-$C_6$-alkylene oxide, where up to 33 mol % of alkylene oxide (e) may be replaced by ethylene oxide, for example 0.1 to 30 mol %, preferably 1 to 10 mol %. Figures in mol % are based on the entire proportion of alkylene oxide (e).

In one embodiment of the present invention, alcohol (b) is selected from $C_3$-$C_8$-triols, which are alkoxylated with 1 to 30 mol of $C_3$-$C_6$-alkylene oxide (e) per mole of at least trifunctional alcohol (b), which alkylene oxide (e) is selected from $C_3$-$C_6$-alkylene oxide. Up to 33 mol % of alkylene oxide (e) may be replaced by ethylene oxide.

In one embodiment of the present invention, alcohol (b) is a water-insoluble alcohol. In this context, "water-insoluble" is understood to mean that less than 1 g/l is soluble at 25° C. in distilled water.

In one embodiment of the present invention, at least one further compound (d) can be incorporated (condensed) into oligomer (β) or polymer (β), also known as compound (d) for short, for example at least one further compound having at least one COOH group or at least one alcoholic OH group per molecule. Examples are dicarboxylic acids without C—C double bonds, for example adipic acid or succinic acid. Other examples are $C_2$-$C_{10}$-diols, for example ethylene glycol, propylene glycol, propane-1,3-diol, butane-1,4-diol, neopentyl glycol, N,N-diethanolamine, hexane-1,6-diol, octane-1,8-diol and decane-1,10-diol.

In one embodiment of the present invention, oligomer (β) or polymer (β) comprises in the range from 1 to 25 mol %, preferably 2 to 20 mol %, more preferably 5 to 15 mol %, of compound (d) incorporated therein, based on di- or polycarboxylic acid (a).

In another embodiment of the present invention, no further compounds (d) are incorporated (condensed) into oligomer (β) or polymer (β).

In one embodiment of the present invention, oligomer (β) or polymer (β) may have a hyperbranched structure, the basics of which are as explained, for example, in Sunder et al., *Chem. Eur. J.* 2000, 6, 2499-2506.

In one embodiment of the present invention, oligomer (β) or polymer (β) may have up to twenty, preferably two to ten, branches per molecule.

In one embodiment of the present invention, the degree of branching of oligomer (β) or polymer (β) is in the range from 0.1 to 1.0, preferably 0.1 to 0.9 and especially 0.2 to 0.8. The degree of branching is defined, for example in H. Frey et al., Acta Polym. 1997, 48, 30.

In one embodiment of the present invention, oligomer (β) or polymer (β) has an acid number in the range from 10 to 200 mg KOH/g, preferably 20 to 150 mg KOH/g, more preferably 40 to 120 mg KOH/g, determined to DIN 53402.

In one embodiment of the present invention, oligomer (β) or polymer (β) has a mean molecular weight $M_n$ in the range from 700 to 10 000 g/mol, preferably 800 to 5000 g/mol.

In one embodiment of the present invention, oligomer (β) or polymer (β) has a mean molecular weight $M_w$ in the range from 2000 to 50 000 g/mol, preferably 2000 to 25 000 g/mol.

Mean molecular weight $M_n$ or $M_w$ is preferably measured by gel permeation chromatography (GPC). A suitable standard is polymethyl methacrylate (PMMA).

In one embodiment of the present invention, in the preparation of oligomer (β) or polymer (β), a sufficient amount of dicarboxylic acid (a) or polycarboxylic acid (a) on the one hand, and alcohol (b) and compound of the general formula I on the other hand, is used that the molar ratio of the alcoholic OH groups to the COOH groups is in the range from 1:2 to 2:1, preferably 1:1.7 to 1.7:1, especially 1:1.7 to 1.3:1. In this context, a dicarboxylic anhydride group should count as two COOH groups.

In one embodiment of the present invention, in the preparation of oligomer (β) or polymer (β), alcohol (b) and compound of the general formula I are used in a molar ratio in the range from 5:1 to 1.5:1, preferably 3:1 to 1.5:1 and most preferably 2.5:1 to 1.8:1.

In one embodiment of the present invention, superabsorbent (B) may comprise, as a hydrolysis-stable crosslinker group, divinylamine or N,N'-methylenebisacrylamide incorporated therein.

Inventive mixture may comprise one or more additives (D), for example one or more fillers. Suitable inorganic fillers are, for example, quartz sand, limestone powder, chalk, marble, clay, marl, alumina, talc and/or barite, preference being given to quartz sand and limestone powder. Inorganic fillers may preferably also be present as lightweight fillers such as hollow microspheres of glass, such as blown glass, and as aluminosilicates, such as perlites and expanded clay. Natural lightweight fillers, for example mineral foam, pumice, foamed lava and/or expanded vermiculite are likewise preferred. Inventive organic fillers are, for example, shredded polymer wastes, for example of polyvinyl chloride, polystyrene, polyethylene, polypropylene or melamine resins. Rubber particles and/or Styropor beads are preferred organic fillers.

In one embodiment of the present invention, the weight ratio of binder (A) to copolymer (B) is at least 98:2, preferably at least 99:1.

In one embodiment of the present invention, the weight ratio of binder (A) to copolymer (B) is not more than 1000:1.

In one embodiment of the present invention, inventive mixture comprises in the range from 94 to 99.9% by weight, preferably from 97.9 to 99.5% by weight, of binder (A), in the range from 0.01 to 5% by weight, preferably from 0.1 to 2% by weight, of copolymer (B), optionally a total in the range from 0.01 to 5% by weight, preferably from 0.1 to 3% by weight, of additive(s) (D), based in each case on the overall inventive mixture.

The present invention further provides mineral construction materials comprising water and at least one inventive mixture. Inventive mineral construction materials can be produced, for example, by mixing water with at least one inventive mixture and optionally with sand or gravel. One kind of mixing is, for example, stirring. Another kind of mixing takes place in a rotatable unit with baffles, for example in a concrete mixer.

The water used may have any desired hardness, measured, for example, in ° dH.

In one embodiment of the present invention, inventive mineral construction materials have a solids content in the range of at least 50% by weight, preferably at least 60% by weight.

In another embodiment of the present invention, inventive mineral construction materials have a water content of up to 80% by weight.

In one embodiment of the present invention, inventive mineral construction materials have a solids content of not more than 99% by weight.

In one embodiment of the present invention, inventive mixtures are dry mortars, preferably a tile adhesive, joint filler, a spackling paste, sealing slurry or mortar.

In one embodiment of the present invention, the inventive mixtures are a leveling material or a concrete, especially a ready-mixed concrete.

Inventive mineral construction materials and inventive mixtures can be used particularly efficiently to produce built structures, especially built structures which are produced using precast concrete components. Such precast components can be produced, for example, in the readymix process. Inventive mineral construction materials have a very time-dependent viscosity behavior. First, for example over a period in the range from one minute after production to about 3 hours, preferably to about 2 hours, inventive construction materials have good flow behavior. For example, inventive construction materials can be poured out of vessels. In addition, inventive construction materials can be distributed, especially spread, with suitable equipment, for example with trowels.

After a prolonged period, for example at least three hours after the formulation thereof, preferably two hours after the formulation thereof, inventive construction materials solidify within a short time interval, for example within 10 minutes, preferably within five minutes, to such a degree that they are no longer free-flowing. They can then no longer be poured out of vessels, and instead, for example, only fall out in the manner of a blancmange and form essentially dimensionally stable plaques.

Built structures produced with the aid of inventive mixtures or inventive mineral construction materials, for example houses or bridges, can be produced particularly efficiently and within a short time.

A further aspect of the present invention is oligomeric or polymeric compounds (β'), also known hereinafter as inventive oligomers (β') or inventive polymers (β'). Inventive oligomers (β') or inventive polymers (β') are obtainable by reacting (a) at least one ethylenically unsaturated di- or polycarboxylic acid or anhydride or ester thereof with
(b) at least one at least trifunctional alcohol and
(c) at least one compound of the general formula I in which the variables are each defined as follows:
$R^1$ is selected from $C_1$-$C_4$-alkyl and hydrogen,
A is the same or different and is selected from $C_2$-$C_6$-alkylene,
n is in the range from 4 to 40, and
(d) optionally at least one further compound having at least one COOH group or at least one alcoholic OH group per molecule, where at least trifunctional alcohol (b) is selected from $C_3$-$C_8$-triols which may be and preferably are alkoxylated with alkylene oxide (e), which alkylene oxide (e) is selected from $C_3$-$C_6$-alkylene oxide, for example propylene oxide, butylene oxide, tetrahydrofuran, individually or as a mixture, preferably mixtures of propylene oxide and butylene oxide, more preferably of propylene oxide and butylene oxide, and especially propylene oxide.

In one embodiment of the present invention, dicarboxylic acid (a) is selected from ethylenically unsaturated $C_4$-$C_{10}$-di- or -polycarboxylic acids, preferably from monoethylenically unsaturated $C_4$-$C_{10}$-dicarboxylic acids, i.e. $C_4$-$C_{10}$-dicarboxylic acids with one C—C double bond per molecule, or the anhydrides thereof or the mono- or di- or poly-$C_1$-$C_4$-alkyl esters thereof, especially the mono- or dimethyl esters or the mono- or diethyl esters. Examples of dicarboxylic acid (a) are maleic acid, fumaric acid, itaconic acid, citraconic acid, methylenemalonic acid, mesaconic acid, maleic anhydride, especially maleic acid and maleic anhydride.

In one embodiment of the present invention, alcohol (b) is selected from tri-, tetra- or polyols having 3 to 10 carbon atoms per molecule, for example glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, N,N,N-triethanolamine, triisopropylamine, trimethylolbutane, trimethylolpropane, trimethylolethane, pentaerythritol or dipentaerythritol, bistrimethylolpropane, bistriethylolpropane, sugar alcohols, for example mesoerythritol, threitol, sorbitol, mannitol or mixtures of the above alcohols (b). Preference is given to glycerol, trimethylolpropane, trimethylolethane or pentaerythritol, very particular preference to trimethylolpropane.

In one embodiment of the present invention, alcohol (b) is selected from $C_3$-$C_8$-triols alkoxylated with 1 to 30 mol of $C_3$-$C_6$-alkylene oxide (e) per mole of at least trifunctional alcohol (b), which alkylene oxide (e) is selected from $C_3$-$C_6$-alkylene oxide. Up to 33 mol % of alkylene oxide (e) may be replaced by ethylene oxide.

In one embodiment of the present invention, up to 33 mol % of alkylene oxide (e) is replaced by ethylene oxide, for example 0.1 to 30 mol %, preferably 1 to 10 mol %. Figures in mol % are based on the total proportion of alkylene oxide (e).

In one embodiment of the present invention, alcohol (b) is water-insoluble alcohol. In this context, "water-insoluble" is understood to mean that less than 1 g/l is soluble at 25° C. in distilled water.

In one embodiment of the present invention, at least one further compound (d) can be incorporated (condensed) in inventive oligomer (β') or inventive polymer (β'), also known as compound (d) for short, for example at least one further compound having at least one COOH group or at least one alcoholic OH group per molecule. Examples are dicarboxylic acids without C—C double bonds, for example adipic acid or succinic acid. Other examples are $C_2$-$C_{10}$-diols. Examples of suitable $C_2$-$C_{10}$-diols are mentioned above.

In another embodiment of the present invention, no further compounds (d) are incorporated (condensed) in inventive oligomer (β') or inventive polymer (β').

In one embodiment of the present invention, inventive oligomer (β') or inventive polymer (β') may have a hyperbranched structure, the basics of which are as explained, for example, in Sunder et al., Chem. Eur. J. 2000, 6, 2499-2506.

In one embodiment of the present invention, inventive oligomer (β') or inventive polymer (β') may have up to ten, preferably two to five, branches per molecule.

In one embodiment of the present invention, the degree of branching of inventive oligomer (β') or inventive polymer (β') is in the range from 0.1 to 1.0, preferably 0.1 to 0.9 and especially 0.2 to 0.8.

In one embodiment of the present invention, inventive oligomer (β') or inventive polymer (β') has an acid number in the range from 10 to 200 mg KOH/g, preferably 20 to 150 mg KOH/g, more preferably 40 to 120 mg KOH/g, determined to DIN 53402.

In one embodiment of the present invention, inventive oligomer (β') or inventive polymer (β') has a mean molecular weight $M_n$ in the range from 700 to 10 000 g/mol, preferably 800 to 5000 g/mol, determined, for example, by GPC.

In one embodiment of the present invention, inventive oligomer (β') or inventive polymer (β') has a mean molecular weight $M_w$ in the range from 2000 to 50 000 g/mol, preferably 2000 to 25 000 g/mol, determined, for example, by GPC.

In one embodiment of the present invention, in the preparation of inventive oligomer (β') or inventive polymer (β'), a sufficient amount of dicarboxylic acid (a) or polycarboxylic acid (a) on the one hand and alcohol (b) on the other hand is used that the molar ratio of the alcoholic OH groups to the COOH groups is in the range from 1:2 to 2:1, preferably 1:1.7 to 1.7:1, especially 1:1.7 to 1.3:1. In this context, a dicarboxylic anhydride group should count as two COOH groups.

In one embodiment of the present invention, in the preparation of inventive oligomer (β') or inventive polymer (β'), alcohol (b) and compound of the general formula I are used in a molar ratio in the range from 5:1 to 1.5:1, preferably 3:1 to 1.5:1 and most preferably 2.5:1 to 1.8:1.

The present invention further provides copolymers (B), in the context of the present invention also known as inventive copolymers (B), which are prepared by reacting
(α1) at least one ethylenically unsaturated comonomer having at least one functional group selected from COOH groups, sulfonic acid groups, nitrile groups, hydroxyalkyl groups and amino groups, especially $NH_2$ groups, or
(α2) at least one (co)polymer of at least one ethylenically unsaturated comonomer having at least one functional group selected from COOH groups, sulfonic acid groups, nitrile groups, hydroxyalkyl groups and amino groups, especially $NH_2$ groups, with
(β) at least one oligomeric or polymeric compound which is characterized as described above. Particularly suitable examples of oligomeric or polymeric compounds (β) are inventive oligomeric or polymeric compounds (β').

In one embodiment of the present invention, inventive copolymer (B) is one in which at least one ethylenically unsaturated comonomer having at least one functional group is selected from (meth)acrylic acid and (meth)acrylamide.

A further aspect of the present invention is a process for preparing inventive oligomers (β') or inventive polymers (β'), also known as inventive preparation process for short. In the inventive preparation process, (a) at least one ethylenically unsaturated di- or polycarboxylic acid or anhydride or ester thereof with
(b) at least one at least trifunctional alcohol and
(c) at least one compound of the general formula I in which the variables are each defined as follows:
$R^1$ is selected from $C_1$-$C_4$-alkyl and hydrogen,
A is the same or different and is selected from $C_2$-$C_6$-alkylene,
n is in the range from 4 to 40,
and
(d) optionally at least one further compound having at least one COOH group or at least one alcoholic OH group per molecule, are reacted with one another,
where at least trifunctional alcohol (b) is selected from $C_3$-$C_8$-triols alkoxylated with alkylene oxide (e), which alkylene oxide (e) is selected from $C_3$-$C_6$-alkylene oxide.

In this context, ethylenically unsaturated di- or polycarboxylic acid (a), alcohol (b), compound of the general formula I, alkylene oxide (e) and optionally used compound (d) are each as defined above. Up to 33 mol % of alkylene oxide (e) may be replaced by ethylene oxide.

To prepare inventive oligomer (β') or inventive polymer (β'), it is possible, for example, to proceed in such a way that at least one dicarboxylic acid (a) or polycarboxylic acid (a), at least one alcohol (b), at least one compound of the general formula I and optionally a further compound (d) are reacted with one another.

In one embodiment of the present invention, in the preparation of inventive oligomer (β') or inventive polymer (β'), a sufficient amount of dicarboxylic acid (a) or polycarboxylic acid (a) on the one hand and a sufficient amount of alcohol (b) and compound of the general formula I on the other hand is used that the molar ratio of the alcoholic OH groups to the COOH groups is in the range from 1:2 to 2:1, preferably 1:1.7 to 1.7:1, especially 1:1.7 to 1.3:1. In this context, one dicarboxylic anhydride group should count as two COOH groups.

To prepare inventive oligomer (β') or inventive polymer (β'), it is possible to work without using catalysts. Preference is given to working using at least one acidic inorganic, organometallic or organic catalyst, or mixtures of a plurality of acidic inorganic, organometallic or organic catalysts.

Examples of acidic inorganic catalysts in the context of the present invention are sulfuric acid, phosphoric acid, phosphonic acid, hypophosphorous acid, aluminum sulfate hydrate, alum, acidic silica gel (pH≦6, especially ≦5) and acidic alumina. It is additionally possible to use, for example, aluminum compounds of the general formula $Al(OR^2)_3$ and titanates of the general formula $Ti(OR^2)_4$ as acidic inorganic catalysts, where the $R^2$ radicals may each be the same or different and are each independently selected from $C_1$-$C_{10}$-alkyl radicals, for example methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, isoamyl, n-hexyl, iso-hexyl, sec-hexyl, n-heptyl, isoheptyl, n-octyl, 2-ethylhexyl, n-nonyl or n-decyl, and from $C_3$-$C_{12}$-cycloalkyl radicals, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R^2$ radicals in $Al(OR^2)_3$ and $Ti(OR^2)_4$ are preferably each the same and are selected from isopropyl and 2-ethylhexyl.

Preferred acidic organometallic catalysts are, for example, selected from dialkyltin oxides $(R^2)_2SnO$ where $R^2$ is as defined above. A preferred representative of acidic organometallic catalysts is di-n-butyltin oxide, which is commercially available as so-called oxo-tin. Particularly suitable acidic organometallic catalysts are di-$C_1$-$C_8$-alkyl derivates of tin salts of aliphatic carboxylic acids, such as di-n-butyltin diacetate or di-n-butyltin dilaurate. Also suitable are tin salts of organic acids, for example tin diacetate, tin dioctoate and tin dilaurate.

Preferred acidic organic catalysts are acidic organic compounds with, for example, phosphate groups, sulfonic acid groups, sulfate groups or phosphonic acid groups. Particular preference is given to sulfonic acids, for example para-toluenesulfonic acid. It is also possible to use acidic ion exchangers as acidic organic catalysts, for example sulfo-containing polystyrene resins which are crosslinked with about 2 mol % of divinylbenzene.

It is also possible to use combinations of two or more of the aforementioned catalysts. It is also possible to use such organic or organometallic or else inorganic catalysts which are present in the form of discrete molecules in immobilized form.

If it is desired to use acidic inorganic, organometallic or organic catalysts, in accordance with the invention, 0.001 to 10% by weight, preferably 0.02 to 0.1% by weight, of catalyst is used, based on the mass of all of the starting materials to be converted.

In another variant, one or more enzymes can be used as catalysts. Preference is given to the use of lipases and esterases. Very suitable lipases and esterases are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei,* pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii,* or Esterases from *Bacillus* spp. and *Bacillus thermoglucosidasius.* Particular preference is given to *Candida antarctica* Lipase B. The enzymes listed are commercially available, for example from Novozymes Biotech Inc., Denmark.

Preference is given to using the enzyme in immobilized form, for example on silica gel or Lewatit®. Methods for immobilizing enzymes are known per se, for example from Kurt Faber, "Biotransformations in organic chemistry", 3rd edition 1997, Springer Verlag, Chapter 3.2 "Immobilization", pages 345-356. Immobilized enzymes are commercially available, for example from Novozymes Biotech Inc., Denmark.

The amount of enzyme used is 1 to 20% by weight, especially 10 to 15% by weight, based on the mass of all of the starting materials to be converted.

The inventive preparation process can be performed in the presence of a solvent or solvent mixture. Suitable examples are hydrocarbons such as paraffins or aromatics.

Particularly suitable paraffins are n-heptane and cyclohexane. Particularly suitable aromatics are toluene, ortho-xylene, meta-xylene, para-xylene, xylene as an isomer mixture, ethylbenzene, chlorobenzene and ortho- and meta-dichlorobenzene. In addition, very particularly suitable solvents in the absence of acidic catalysts are: ethers, for example dioxane or tetrahydrofuran, and ketones, for example methyl ethyl ketone and methyl isobutyl ketone.

The amount of solvent added is at least 0.1% by weight, based on the mass of the starting materials to be converted, preferably at least 1% by weight and more preferably at least 10% by weight. It is also possible to use excesses of solvent, based on the mass of starting materials to be converted, for example a 1.01- to 10-fold excess. Amounts of solvent of more than 100 times the mass of starting materials to be converted are not advantageous, because the reaction rate declines significantly at significantly lower concentrations of the reactants, which leads to uneconomically long reaction times.

In another variant of the inventive preparation process, no solvent is used.

To perform the inventive preparation process, it is possible to work in the presence of a water-withdrawing agent as an additive which is added at the start of the reaction. Suitable examples are molecular sieves, especially molecular sieve having a pore diameter of 4 Å, $MgSO_4$ and $Na_2SO_4$. It is also possible to add further water-withdrawing agent during the reaction, or to replace water-withdrawing agent with fresh water-withdrawing agent. It is also possible to distill off water or alcohol formed during the reaction and, for example, to use a water separator. It is also possible to distill off water formed azeotropically with the aid of a suitable solvent.

When, instead of free dicarboxylic acid (a) or polycarboxylic acid (a) or anhydrides, a $C_1$-$C_4$-alkyl mono- or dicarboxylate is used, the same applies mutatis mutandis for the $C_1$-$C_4$-alcohol released during the reaction.

In one embodiment of the present invention, the inventive preparation process is performed under an inert gas atmosphere, i.e., for example, under carbon dioxide, nitrogen or noble gas, among which mention should be made especially of argon.

In one embodiment of the present invention, the inventive preparation process is performed at temperatures of 80 to 220° C. Preference is given to working at temperatures of 130 to 200° C., especially to 190° C. or lower. If it is desired to use, as the catalyst, one or more enzymes, the reaction temperature should preferably not exceed 110° C., especially 75° C.

The pressure conditions of the inventive preparation process are uncritical per se. It is possible to work at significantly reduced pressure, for example at 10 to 500 mbar. The inventive preparation process can also be performed at pressures above 500 mbar. For reasons of simplicity, preference is given to reaction at atmospheric pressure; however, performance is also possible at slightly elevated pressure, for example up to 1200 mbar. It is also possible to work under significantly elevated pressure, for example at pressures up to 10 bar. Preference is given to reaction at atmospheric pressure.

The reaction time of the inventive preparation process is typically 10 minutes to 25 hours, preferably 30 minutes to 10 hours and more preferably one to 8 hours.

After the reaction has ended, inventive oligomers (β') or inventive polymers (β') can be isolated easily, for example by removal, especially removal of any catalyst used by filtration. When one or more solvents have been used, it is possible to concentrate after the actual reaction, the concentration typically being performed under reduced pressure. Volatile by-products can be removed, for example, by stripping, preferably by stripping with nitrogen. Further very suitable workup methods are precipitation after addition of water and subsequent washing and drying.

In another embodiment of the present invention, inventive oligomers (β') or inventive polymers (β') are processed further without any further workup steps.

The present invention further provides for the use of inventive oligomeric or polymeric compounds (β') for preparing inventive copolymers (B). The preparation of inventive copolymers (B), also known as inventive copolymer preparation process for short, can be performed by various methods which differ essentially in the sequence of addition of the different copolymer units.

In one variant of the inventive copolymer preparation process, the procedure may be to first prepare a (co)polymer (α2), for example by preferably free-radical (co)polymerization, and then reacting it with at least one oligomeric or polymeric compound (β), preferably at least one inventive oligomeric or polymeric compound (β') This second step may, for example, be free-radically initiated or be a concerted reaction, for example an ene reaction.

In another variant of the inventive copolymer preparation process, the procedure may be to preferably free-radically polymerize at least one ethylenically unsaturated comonomer (α1) in the presence of at least one oligomeric or polymeric compound (β), preferably at least one inventive oligomeric or polymeric compound (β').

In one embodiment of the present invention, inventive copolymer (B) is prepared by free-radical copolymerization selected from bulk polymerization, solution polymerization, gel polymerization, emulsion polymerization, dispersion polymerization and suspension polymerization. Other suitable variants have been found to be those in which the copolymerization is performed in aqueous phase in inverse emulsion or in inverse suspension.

In one embodiment of the present invention, the copolymerization to prepare the inventive copolymers (B) is performed at temperatures in the range from −20° C. to 150° C.

In one embodiment of the present invention, the inventive copolymer preparation process is performed adiabatically. For example, the copolymerization can be initiated at temperatures of +10° C. or lower, and the reaction is then ended at a temperature of 80 to 100° C.

In one variant of the inventive copolymer preparation process, the copolymerization is started at temperatures in the range from −20 to +30° C., preferably from −10 to +20° C. and especially in the range from 0 to 10° C.

In one embodiment of the present invention, the inventive copolymer preparation process is started with the aid of at least one initiator, an inorganic or preferably organic peroxide. Examples of suitable peroxides are alkali metal peroxodisulfates, for example sodium peroxodisulfate, ammonium peroxodisulfate, furthermore hydrogen peroxide, organic peroxides such as diacetyl peroxide, di-tert-butyl peroxide, diamyl peroxide, dioctanoyl peroxide, didecanoyl peroxide, dilauroyl peroxide, dibenzoyl peroxide, bis(o-tolyl)peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, di-tert-butyl peroxide, tert-butyl hydroperoxide, cumene hydroperoxide, tert-butyl peroxy-2-ethylhexanoate and diisopropyl peroxydicarbamate. Suitable initiators are also azo compounds, for example azobisisobutyronitrile, azobis(2-amidopropane) dihydrochloride and 2,2'-azobis(2-methylbutyronitrile).

Redox initiators are likewise suitable, for example composed of peroxide and oxidizable sulfur compound. Very particular preference is given to systems composed of acetone bisulfite and organic peroxide such as tert-$C_4H_9$—OOH, $Na_2S_2O_5$ (sodium disulfite) and organic peroxide such as tert-$C_4H_9$—OOH or HO—$CH_2SO_2Na$ and organic peroxide such as tert-$C_4H_9$—OOH. Systems such as ascorbic acid/ $H_2O_2$, for example, are also particularly preferred.

Peroxidic salts are very particularly suitable, for example alkali metal salts of peroxodisulfate, especially $K_2S_2O_8$ and $Na_2S_2O_8$.

The pressure conditions are generally uncritical; suitable examples are pressures in the range from standard pressure to 10 bar.

Of course, further additives customary in the process used can be added to the reaction mixture, in the case of an emulsion polymerization, for example, glycols, polyethylene glycols, surfactants, emulsifiers, protective colloids and buffers/pH regulators.

The duration selected for the emulsion polymerization may, for example, be a period in the range from 30 minutes to 12 hours, preferably 2 to 5 hours.

A further aspect of the present invention is the use of inventive copolymers for blocking underground formations in the extraction of fossil oil and/or gas. A further aspect of the present invention is a process for blocking underground formations in the extraction of fossil oil and/or gas using inventive copolymers (B).

The process according to the invention for blocking underground formations in the extraction of fossil oil and/or gas can be performed, for example, in such a way that, in a first step, water-absorbing particles, which comprise copolymer (B), are introduced into liquid-bearing and porous rock formations, and wherein the particles in the water-bearing rock formation, by absorbing water, prevent liquid flow through the rock layer(s).

In one embodiment of the present invention, the particles of copolymer (B) may have a mean diameter in the range from 0.5 to 1000 μm, preferably from 1 to 200 μm and more preferably from 10 to 100 μm.

The introduction can be performed, for example, in a nonaqueous medium or in an aqueous solution with a high salt content, for example in an at least 20% by weight $CaCl_2$ solution.

The invention is illustrated by examples.

General remarks:

The molecular weights were determined by gel permeation chromatography (GPC) (eluent: THF, standard: PMMA). The acid number was determined in each case to DIN 53402.

TMP·x PO is understood to mean trimethylolpropane alkoxylated with x mol of propylene oxide, where x may be a (numerical) average. Glycerol·x PO is accordingly understood to mean glycerol alkoxylated with x mol of propylene oxide. Figures in % relate to percentages by weight, unless explicitly stated otherwise.

I. Preparation of Inventive Oligomeric or Polymeric Compounds (β')

I.1 Preparation of Inventive Compound (β'.1)

Molar (a.1):(b.1):(c.1) ratio such as 4:2:1

In a 1 l round-bottom flask with water separator, 100.0 g (1.02 mol) of maleic anhydride (a.1), 101.9 g (0.51 mol) of TMP·1.2 PO (b.1) and 127.4 g (0.25 mol) of polyethylene glycol monomethyl ether ($M_n$=500 g/mol) (c.1) were mixed with one another. After adding one drop (0.02 g) of di-n-butyltin dilaurate, the mixture was heated to 190° C. and stirred at 190° C. for three hours. It was then cooled to room temperature. Inventive compound (β'.1) was obtained in the form of a pale yellow resin.

Acid number=78 mg KOH/g
$M_n$=930 g/mol, $M_w$=5900 g/mol

I.2 Preparation of Inventive Compound (β'.2)

Molar (a.1):(b.2):(c.1) ratio such as 4:2:1

In a 1 l round-bottom flask with water separator, 100.0 g (1.02 mol) of maleic anhydride (a.1), 107.0 g (0.51 mol) of glycerol·2.0 PO (b.2) and 127.4 g (0.25 mol) of polyethylene glycol monomethyl ether ($M_n$=500 g/mol) (c.1) were mixed with one another. After adding 1 drop (0.02 g) of di-n-butyltin dilaurate, the mixture was heated to 190° C. and stirred at 190° C. for 3.5 hours. It was then cooled to room temperature. Inventive compound (β'.2) was obtained in the form of a pale yellow resin.

Acid number=78 mg KOH/g
$M_n$=930 g/mol, $M_w$=4650 g/mol

I.3 Preparation of Inventive Compound (β'.3)

Molar (a.1):(b.1):(c.1):(d.1) ratio such as 2:0.8:0.5:0.3

In a 1 l round-bottom flask with water separator, 180.0 g (1.84 mol) of maleic anhydride (a.1), 146.8 g (0.73 mol) of TMP·1.2 PO (b.1), 229.4 g (0.46 mol) of polyethylene glycol monomethyl ether ($M_n$=500 g/mol) (c.1) and 28.7 g (0.28 mol) of neopentyl glycol (d.1) were mixed with one another. After adding 1 drop of di-n-butyltin dilaurate, the mixture was heated to 190° C. and stirred at 190° C. for two hours. It was then cooled to room temperature. Inventive compound (β'.3) was obtained in the form of a pale yellow resin.

Acid number=86 mg KOH/g
$M_n$=920 g/mol, $M_w$=4190 g/mol

I.4 Preparation of Inventive Compound (β'.4)

Molar (a.1):(b.1):(c.1):(b.3) ratio such as 2:0.8:0.5:0.2

In a 1 l round-bottom flask with water separator, 180.0 g (1.84 mol) of maleic anhydride (a.1), 146.7 g (0.73 mol) of TMP·1.2 PO (b.1), 229.2 g (0.46 mol) of polyethylene glycol monomethyl ether ($M_n$=500 g/mol) (c.1) and 24.6 g (0.18 mol) of TMP (b.3) were mixed with one another. After adding 2 drops of di-n-butyltin dilaurate, the mixture was heated to 190° C. and stirred at 190° C. for 3 hours. It was then cooled to room temperature. Inventive compound (β'.4) was obtained in the form of a pale yellow resin.

Acid number=60 mg KOH/g
$M_n$=1000 g/mol, $M_w$=7770 g/mol

I.5 Preparation of Inventive Compound (β'.5)

Molar (a.1):(b.1):(c.2) ratio=4:2:1

In a 1 l round-bottom flask with water separator, 150.0 g (1.53 mol) of maleic anhydride (a.1), 151.5 g (0.76 mol) of TMP·1.2 PO (b.1) and 382.2 g (0.38 mol) of polyethylene glycol monomethyl ether ($M_n$=1000 g/mol) (c.2) were mixed with one another. After adding one drop (0.02 g) of di-n-butyltin dilaurate, the mixture was heated to 190° C. and stirred at 190° C. for three hours. It was then cooled to room temperature. Inventive compound (β'.5) was obtained in the form of a pale yellow resin.

Acid number=72 mg KOH/g
$M_n$=1270 g/mol, $M_w$=3950 g/mol

II. Preparation of Inventive Copolymers (B)

The following abbreviations are used:

Na-AMPS=2-acrylamido-2-methylpropanesulfonic acid sodium salt

MbA=N,N'-methylenebisacrylamide
HPA=hydroxypropyl acrylate (isomer mixture)

II.1 Preparation of Inventive Copolymer (B.1)

Copolymer of Na-AMPS and acrylamide with MbA and (β'.4)

A 2 l three-neck flask with stirrer and thermometer was initially charged with 148.8 g of water, and then 352.5 g (0.74 mol, 27 mol %) of Na-AMPS (50% by weight solution in water), 286.4 g (2.0 mol, 70 mol %) of acrylamide (α1.1), as 50% by weight solution in water, 11.2 g of inventive compound (β'.4) and 0.3 g (0.0021 mol, 0.08 mol %) of MbA were added successively. A pH of 7 was established with 20% by weight aqueous sodium hydroxide solution and the mixture was purged with nitrogen for thirty minutes. Then it was cooled to approx. 5° C. The solution was transferred to a plastic vessel with dimensions (width·depth·height) 15 cm·10 cm·20 cm, and then 16 g of a 1% by weight aqueous 2,2'-azobis(2-amidinopropane) dihydrochloride solution, 20 g of a 1% by weight aqueous $Na_2S_2O_8$ solution, 0.7 g of a 1% by weight aqueous $HO—CH_2SO_2Na$ solution, 16.2 g of a 0.1% aqueous tert-butyl hydroperoxide solution and 2.5 g of a 0.1% by weight aqueous $FeSO_4.7\,H_2O$ solution were added successively. The copolymerization was started by irradiating with UV light (two Philips tubes; Cleo Performance 40 W). After two hours, inventive copolymer (B.1) was taken from the plastic vessel in the form of a hardened gel and cut with scissors into cubes of edge length approx. 5 cm. The cubes were painted with a separating agent of Sitren® 595 (polydimethylsiloxane emulsion; from Goldschmidt) diluted with water in a ratio of 1:20, which were comminuted with the aid of a meat grinder. This afforded a gel granule of inventive copolymer (B.1).

The gel granule of inventive copolymer (B.1) was distributed homogeneously on drying grids and dried to constant weight in a forced air drying cabinet at 100 to 120° C. This afforded approx. 300 g of a white, hard granule which was converted to pulverulent state with the aid of a centrifugal mill. The mean particle diameter of the powder was 30 to 50 μm, and the proportion of particles which do not pass through a sieve of mesh size 63 μm was less than 2% by weight.

The test of the time-dependent behavior in a construction material mixture was carried out as follows:

1350 g of standard sand and 450 g of cement were mixed in a Rilem mixer to DIN EN 196. Subsequently, 275 g of water were added, so as to give rise to a slump of 23 cm. Still following the procedure of DIN EN 196, the time-dependent slump was determined. The time-dependent slump is reported as a reference.

in a 1 l bucket, 1350 g of standard sand, 0.9 g of pulverulent inventive copolymer (B.1) and 450 g of cement were mixed. Subsequently, 275 g of water were added. Subsequently, the slump was observed over two hours. The results can be found in diagram 1.

II.2 Preparation of Inventive Copolymer (B.2)

Copolymer of acrylamide, HPA with pentaerythrityl triallyl ether and inventive compound (β'.5)

A 2 l three-neck flask with stirrer and thermometer was initially charged with 141.8 g of water, and then 313.76 g (2.21 mol, 83.1 mol %) of acrylamide (α1.1) as 50% by weight solution in water, 58.32 g of HPA (0.448 mol, 16.8 mol %), 0.32 g of pentaerythrityl triallyl ether (0.00125 mol, 0.1 mol %) and 11.2 g of inventive compound (β'.5) and 0.3 g (0.0021 mol, 0.08 mol %) of MbA were added successively. A pH of 5 was established with 20% by weight aqueous sodium hydroxide solution and the mixture was purged with nitrogen for thirty minutes. It was then cooled to approx. 5° C. The solution was transferred to a plastic vessel with dimensions (width·depth·height) of 15 cm·10 cm·20 cm, and then 16 g of a 1% by weight aqueous 2,2'-azobis(2-amidinopropane) dihydrochloride solution, 20 g of a 1% by weight aqueous $Na_2S_2O_8$ solution, 0.7 g of a 1% by weight aqueous $HO—CH_2SO_2Na$ solution, 16.2 g of a 0.1% aqueous tert-butyl hydroperoxide solution and 2.5 g of a 0.1% by weight aqueous $FeSO_4.7\,H_2O$ solution were added successively. The copolymerization was started by irradiating with UV light (two Philips tubes; Cleo Performance 40 W). After two hours, inventive copolymer (B.2) was taken from the plastic vessel in the form of a hardened gel and cut with scissors into cubes of edge length approx. 5 cm. The cubes were painted with a separating agent of Sitren® 595 (polydimethylsiloxane emulsion; from Goldschmidt) diluted with water in a ratio of 1:20, and comminuted with the aid of a meat grinder. This afforded a gel granule of inventive copolymer (B.2).

The gel granule of inventive copolymer (B.2) was distributed homogeneously on drying grids and dried to constant weight in a forced air drying cabinet at 100 to 120° C. This afforded approx. 300 g of a white, hard granule which was converted to a pulverulent state with the aid of a centrifugal mill. The mean particle diameter of the powder was 30 to 50 μm, and the proportion of particles which do not pass through a sieve of mesh size 63 μm was less than 2% by weight.

The testing of the time-dependent behavior in a construction material mixture was carried out as for inventive copolymer (B.2). The results can be found in diagram 2.

The invention claimed is:

1. A mixture comprising
   (A) at least one hydraulic or latently hydraulic binder,
   (B) at least one copolymer obtainable by reacting
   (α1) at least one ethylenically unsaturated comonomer having at least one functional group selected from the group consisting of COOH groups, sulfonic acid groups, nitrile groups, hydroxyalkyl groups and amino groups, or
   (α2) at least one (co)polymer of at least one ethylenically unsaturated comonomer having at least one functional group selected from the group consisting of COOH groups, sulfonic acid groups, nitrile groups, hydroxyalkyl groups and amino groups, with
   (β) at least one oligomeric or polymeric compound obtained by reacting
   (a) at least one ethylenically unsaturated di- or polycarboxylic acid or anhydride or ester thereof with
   (b) at least one alcohol with at least three hydroxyl groups and
   (c) at least one compound of the formula I in which the variables are each defined as follows:

$R^1$ is $C_1$-$C_4$-alkyl,

A is the same or different and is $C_2$-$C_6$-alkylene, n is in the range from 4 to 40, and (d) optionally at least one further compound having at least one COOH group or at least one alcoholic OH group per molecule.

2. The mixture according to claim 1, wherein the hydraulic or latently hydraulic binder (A) is selected from the group consisting of cement, lime, gypsum, hemihydrate, anhydrite, fly ash, pozzolan, tuff and furnace slag.

3. The mixture according to claim 1, wherein the ethylenically unsaturated di- or polycarboxylic acid (a) is selected from the group consisting of $C_4$-$C_{10}$-dicarboxylic acids with one C—C double bond per molecule, anhydrides thereof and esters thereof.

4. The mixture according to claim 1, wherein alcohol with the at least three hydroxyl groups (b) is a $C_3$-$C_8$ triol which may be alkoxylated with a $C_3$-$C_6$-alkylene oxide.

5. The mixture according to claim 1, wherein the alcohol with the at least three hydroxyl groups (b) is a $C_3$-$C_8$ triol alkoxylated with at least one of propylene oxide and butylene oxide.

6. The mixture according to claim 1, wherein the alcohol with the at least three hydroxyl groups (b) is a $C_3$-$C_8$ triol alkoxylated with up to 33 mol % of ethylene oxide.

7. The mixture according to claim 1, wherein the alcohol with the at least three hydroxyl groups (b) is a $C_3$-$C_8$ triol alkoxylated with 1 to 30 mol of a $C_3$-$C_6$-alkylene oxide (e) per mole of the alcohol (b).

8. The mixture according to claim 1, wherein the weight ratio of the binder (A) to the copolymer (B) is at least 98:2.

9. The mixture according to claim 1, wherein the compound (d) is an aliphatic diol having 2 to 10 carbon atoms.

10. A mineral construction material comprising water and the mixture according to claim 1.

11. The mineral construction materials according to claim 10 for producing built structures.

12. The mixture according to claim 1, wherein the compound of formula I is an alkylene glycol monomethyl ether.

13. The mixture according to claim 1, wherein the oligomeric or polymeric compound (β) comprises reacted units of (a) at least one of maleic anhydride and maleic acid, (b) at least one alcohol selected from the group consisting of an alkoxylated trimethylol propane having a degree of alkoxylation of from 1.2 to 2.0 and glycerol, and (c) polyethylene glycol monomethyl ether, the ethylenically unsaturated comonomer (α1) is an acrylamide, and the (co)polymer (α2) has at least on sulfonic acid functional group and at least one nitrile functional group.

* * * * *